(12) United States Patent
Harada et al.

(10) Patent No.: US 7,605,957 B2
(45) Date of Patent: Oct. 20, 2009

(54) ORIGINAL DOCUMENT TRANSPORT DEVICE

(75) Inventors: Hiroyuki Harada, Osaka (JP); Masayuki Yamada, Osaka (JP); Yasuyuki Hirai, Osaka (JP); Minoru Matsushita, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 653 days.

(21) Appl. No.: 11/258,906

(22) Filed: Oct. 27, 2005

(65) Prior Publication Data

US 2007/0097458 A1    May 3, 2007

(51) Int. Cl.
*H04N 1/04* (2006.01)
(52) U.S. Cl. .................. 358/498; 358/496; 358/488; 399/367; 399/371
(58) Field of Classification Search ......... 358/400–498; 399/16, 17, 306, 309, 361, 364–365, 367, 399/371–372, 374
See application file for complete search history.

(56) References Cited

U.S. PATENT DOCUMENTS

| | | | | |
|---|---|---|---|---|
| 4,561,765 A | * | 12/1985 | Masuda | 399/367 |
| 5,192,261 A | * | 3/1993 | Honjo et al. | 493/29 |
| 5,463,451 A | * | 10/1995 | Acquaviva et al. | 399/211 |
| 5,513,013 A | * | 4/1996 | Kuo | 358/448 |
| 6,085,049 A | * | 7/2000 | Tanigawa | 399/20 |
| 6,102,385 A | * | 8/2000 | Wakamatsu et al. | 270/58.12 |
| 6,170,821 B1 | * | 1/2001 | Kubota | 271/288 |
| 6,190,070 B1 | * | 2/2001 | Urban et al. | 400/636.3 |
| 6,629,795 B2 | * | 10/2003 | Kinoshita et al. | 400/582 |
| 7,128,317 B2 | * | 10/2006 | Johnson et al. | 271/121 |

* cited by examiner

*Primary Examiner*—Benny Q Tieu
*Assistant Examiner*—Quyen Ngo
(74) *Attorney, Agent, or Firm*—Shinjyu Global IP

(57) ABSTRACT

An original document feed tray is positioned above an original document output tray. When original documents are set on the original document feed tray, the original document feed tray is moved upwardly from a home position to a position where the uppermost original document sheet can be transported to an original document transport mechanism. When the original document feed tray is lifted in accordance with the reduction of the original documents on the original document feed tray after the original documents are transported to the original document transport mechanism, the original document feed tray is lifted to a position, above the position where all original documents on the original document feed tray were transported to the original document transport mechanism.

6 Claims, 4 Drawing Sheets

ORIGINAL DOCUMENT TRANSPORT DEVICE

FIELD OF THE INVENTION

The present invention relates to an original document transport device used in an image forming device such as a photocopier, facsimile device or the like for transporting an original document to an original document scanning position.

BACKGROUND INFORMATION

An image forming device typically comprises an original document transport device for separating a plurality of original documents (original document stack) one by one to transport the same to an image scanning position of a scanner or the like. Such an original document transport device further comprises an original document feed tray on which an original document is loaded (set), and the original document set on the original document feed tray is delivered to an image scanning position by an original document transport mechanism, and the original document is scanned thereon and output to an original document output tray. Most original document transport devices are configured such that an original document feed tray is disposed on top of an original document output tray.

To make a copy using an image forming device such as a photocopier or the like, a user first sets an original document on an original document feed tray, and presses, for example, a copy button, thus commencing scan of the original document to start forming the image. The scanned original document is sequentially output to the original document output tray. When the scanning of the entire original document ends, the user removes the original document from the original document output tray. At this time, if the space between the original document feed tray and original document output tray is small, removal of the original document from the original document output tray may not be easy.

To address such problem, that is, to improve removability of an original document from an original document output tray, an original document feed tray is divided into a first original document feed table comprising a drive unit and a second original document feed table not having a drive unit, the first and second original document feed tables can independently rotate, and when the original document is to be removed, the second original document feed table is rotated with respect to the first original document feed table, thereby opening the space above the original document output tray only to the extent necessary to facilitate removal of the output original document.

However, even though a conventional original document transport device is configured so that a first and second original document feed table are independently rotated to facilitate removal of an original document output to an original document output tray, there is the problem that when an original document is removed from an original document output tray, the first original document feed table is in the way, in particular, when an original document is removed from an original document output tray using both hands because the number of sheets thereon is large, the first original document feed table may be in the way.

Further, even though, in a conventional original document supply device, consideration is given to removability on removal of an original document from an original document output tray, there is the problem that no consideration is given to convenience in setting an original document onto an original document feed tray; therefore, for example, given the disposition of an original document supply device on the top part of an image forming device, it is extremely troublesome for people in wheelchairs or otherwise physically challenged people or other people who are short to set an original document.

Therefore, in light of the problems with the prior art, it is an object of the present invention to provide an original document transport device that allows easy setting of an original document and smooth removal of a scanned original document.

SUMMARY OF THE INVENTION

Thus, in order to resolve such problems the present invention is an original document transport device having an original document loading unit on which an original document is loaded, an original document transport mechanism for transporting an original document sheet by sheet from the original document loading unit to an original document scanning position, and an original document output unit on which the original document that has passed though the original document scanning position is output, the original document loading unit being disposed on top of the original document output unit, wherein there are provided a drive mechanism that vertically supports the original document loading unit on a device housing and vertically moves the original document loading unit, original document load detection means for detecting that the original document has been loaded on the original document loading unit, first control means for, when the loading of the original document has been detected by original document load detection means, controlling drive of the drive mechanism and upwardly moving the original document loading unit from a first position set in advance to a second position at which the uppermost original document can be transported to the original document transport mechanism, and second control means for, when the drive mechanism has been controlled in accordance with the reduction of original document sheets on the original document loading unit after start of the original document transport, the original document loading unit has been lifted so that the uppermost original document on the original document loading unit is positioned at the second position, and the entire original document on the original document loading unit has been fed, controlling the drive mechanism to upwardly move the original document loading unit above the position at which the entire original document on the original document loading unit was fed, and positioning the same at a third position.

In the present invention, the first position is a position at which, for example, the original document loading unit is in direct contact with the original document output unit, having lower limit position detection means for detecting that the original document loading unit is positioned at the first position, and upper limit position detection means for detecting that the uppermost original document on the original document loading unit is positioned at the second position.

Further, the present invention comprises original document limit detection means for detecting the maximum amount of an original document to be loaded on the original document loading unit, wherein first control means performs control so that when the amount of the original document detected by original document limit detection means is less than the maximum amount, the original document loading unit is moved from the first position to the second position.

Further, the present invention comprises original document output detection means for detecting whether the original document has been output to the original document output unit, wherein second control means performs control so that the original document loading unit is moved from the second position to the third position when in a state where an original document has been detected by original document output detection means and the original document cannot be detected by original document load detection means.

In addition, the present invention may comprise third control means for, when after the original document loading unit has been moved from the second position to the third position by second control means, a state of there being no original document in the original document output unit is detected by original document output detection means, controlling the drive mechanism and lowering the original document loading unit to the first position.

As described above, the original document transport device of the present invention is configured so that, when an original document is loaded on an original document loading unit, the original document loading unit is upwardly moved from the first position set in advance to the second position at which the uppermost original document is transportable to the original document transport mechanism; the original document loading unit is lifted in accordance with the reduction of the original document on the original document loading unit after start of the original document transport, so that the uppermost original document on the original document loading unit is positioned at the second position; when the entire original document on the original document loading unit has been transported, the original document loading unit is upwardly moved to a third position above the position at which the entire original document on the original document loading unit was transported. Therefore, when setting an original document, the position of the original document loading unit is low, and when the scanned original document is to be removed from the original document output unit, the space between the original document output unit and original document loading unit becomes large, with the beneficial effects of easy setting of an original document and smooth removal of a scanned original document.

Further, the present invention is configured so that the first position is a position at which the original document loading unit is in direct contact with the original document output unit, with the beneficial effect of enabling the original document loading unit to be lowered to the lowest possible position.

In the present invention, when the amount of the original document loaded on the original document loading unit is less than the maximum amount, the original document loading unit is controlled so as to be moved from the first position to the second position, with the beneficial effect of preventing an overly large load from being applied on the original document loading unit. Further, the present invention is configured so that the original document loading unit is controlled so as to be moved from the second position to the third position in a state where the original document has been output to the original document output unit and there is no original document on the original document loading unit, thereby preventing the original document loading unit from mistakenly being upwardly moved in a state where there is an original document left on the original document loading unit.

The present invention is configured so that, after the original document loading unit is moved from the second position to the third position, in the case of a state where there in no original document on the original document output unit, the original document loading unit is lowered to the first position, so that at time of original document setting, the original document loading unit can always be positioned at its lowermost position.

DETAILED DESCRIPTION OF THE PREFERRED EMBODIMENTS

Below, with reference to the drawings, preferred embodiments of the present invention will be explained in detail. Unless otherwise specifically described, the sizes, materials and forms of the components described in the embodiments, and the relative arrangement thereof and the like are mere examples that should not be construed as limiting the scope of the claims of this invention.

First Embodiment

Figure 1:
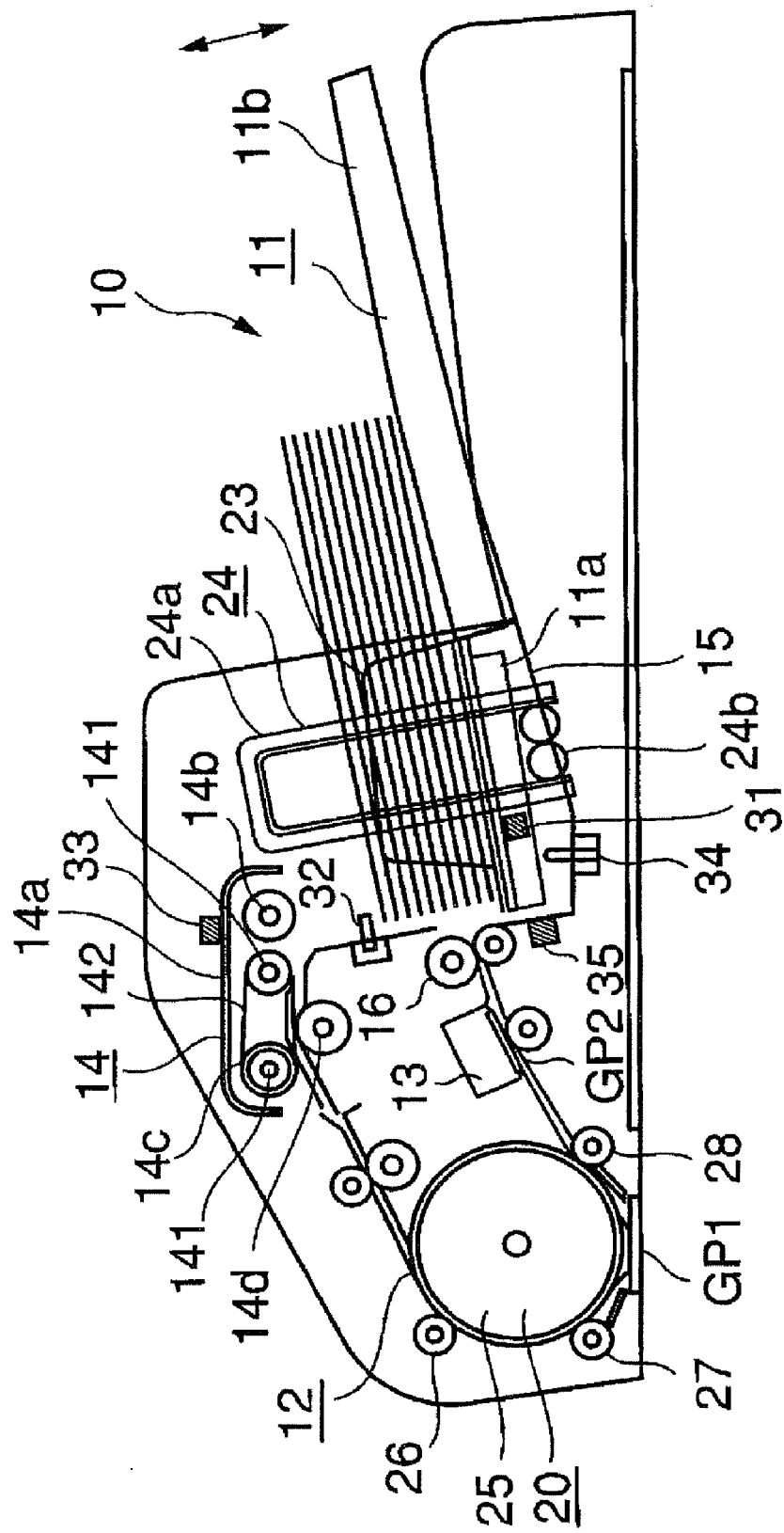
FIG. 1 illustrates a cross-sectional view showing an example of an original document transport device according to the present invention in a state where an original document feed tray is at a home position (first position)

First, with reference to FIG. 1, an original document transport device 10 (shown in the drawing) is used together with an image forming device (for example, photocopier) and is disposed on a top surface of the image forming device (not shown in the drawing) main body. The original document transport device 10 comprises an original document feed tray (original document loading unit) 11 and original document transport mechanism 12, and an original document stack is loaded on the original document feed tray 11. The original document transport mechanism 12 is constituted such that each original document sheet is separated one by one from the original document stack loaded on the original document feed tray 11 and the original document is transported to a first image scanning position GP1.

An image on one surface of the original document is scanned by a first scanner unit (not shown in the drawing) at the first image scanning position GP1, the original document is delivered to a second original document scanning position GP2, and the original document on the other surface of the original document is scanned by a second scanner unit 13. The original document is output to an original document output tray 15 disposed on the bottom of the original document feed tray 11 by a paper output roller 16.

The original document transport device 10 (shown in the drawing) is designed for two-sided printing. For one-sided printing, an image on an original document is scanned only at, for example, the first image scanning position GP1. The image forming device (not shown in the drawing) is configured such that based on image data obtained from a scan of an original document, a photosensitive drum or other image support is exposed and an electrostatic latent image is formed on the image support. The electrostatic latent image is developed using a development device, a toner image on the image support is transferred to a recording paper, the toner image on the recording paper is fixed, and the paper is output to an output tray.

As shown in FIG. 1, the original document transport mechanism 12 is disposed at the rear (i.e., downstream in the original document transport direction) of the original document feed tray 11, and comprises an original document feed roller unit (simply called "feed roller unit") 14. The original document feed roller unit 14 has a roller housing 14a, pickup roller 14b, feed mechanism 14c and separation roller 14d.

The feed mechanism 14c comprises a pair of feed rollers 141, a feed belt 142 is wound tightly across the feed rollers 141, and a separation roller 14d is in direct contact with the feed belt 142. The pickup roller 14b and feed mechanism 14c are accommodated in the roller housing 14a, and the separation roller 14d is provided at the base of the original document transport mechanism 12. The roller housing 14a can pivot supported at the core of the shaft center of the feed roller 141 positioned downstream in the original document transport direction.

In the example of the drawing, the original document feed tray 11 has a first tray unit 11a positioned on the original document transport mechanism 12 side (i.e. downstream in the original document transport direction) and a second tray unit 11b positioned upstream in the original document transport direction, and the second tray unit 11b is rotatable supported at the rear edge of the first tray unit (upstream in the original document transport direction).

The original document feed tray 11 is attached to a device housing so as to be vertically movable as seen in the drawing with respect to the device housing (the direction indicated by the solid line in the drawing), and comprises an original document guide 23 for regulating the original document width on the upper surface of the first tray unit 11a. The first tray unit 11a, that is, the original document feed tray 11, is upwardly driven by the tray drive mechanism 24 from the reference position shown in FIG. 1 (lowermost position (first position): "home position"). The tray drive mechanism 24 (shown in the drawing) has a rack 24a and pinion 24b, and when the pinion 24b is caused to move along the rack 24a by a motor or other drive source (not shown in the drawing), the original document feed tray 11 moves in the vertical direction.

As shown in FIG. 1, the original document output tray 15 is configured as a part of the device housing, and a portion thereof is formed so as to extend diagonally upwards in the original document output downstream direction. The home position is in a state where the lower surface of the second tray unit 11b is in direct contact with the upper surface of the original document output tray 15.

Figure 2:
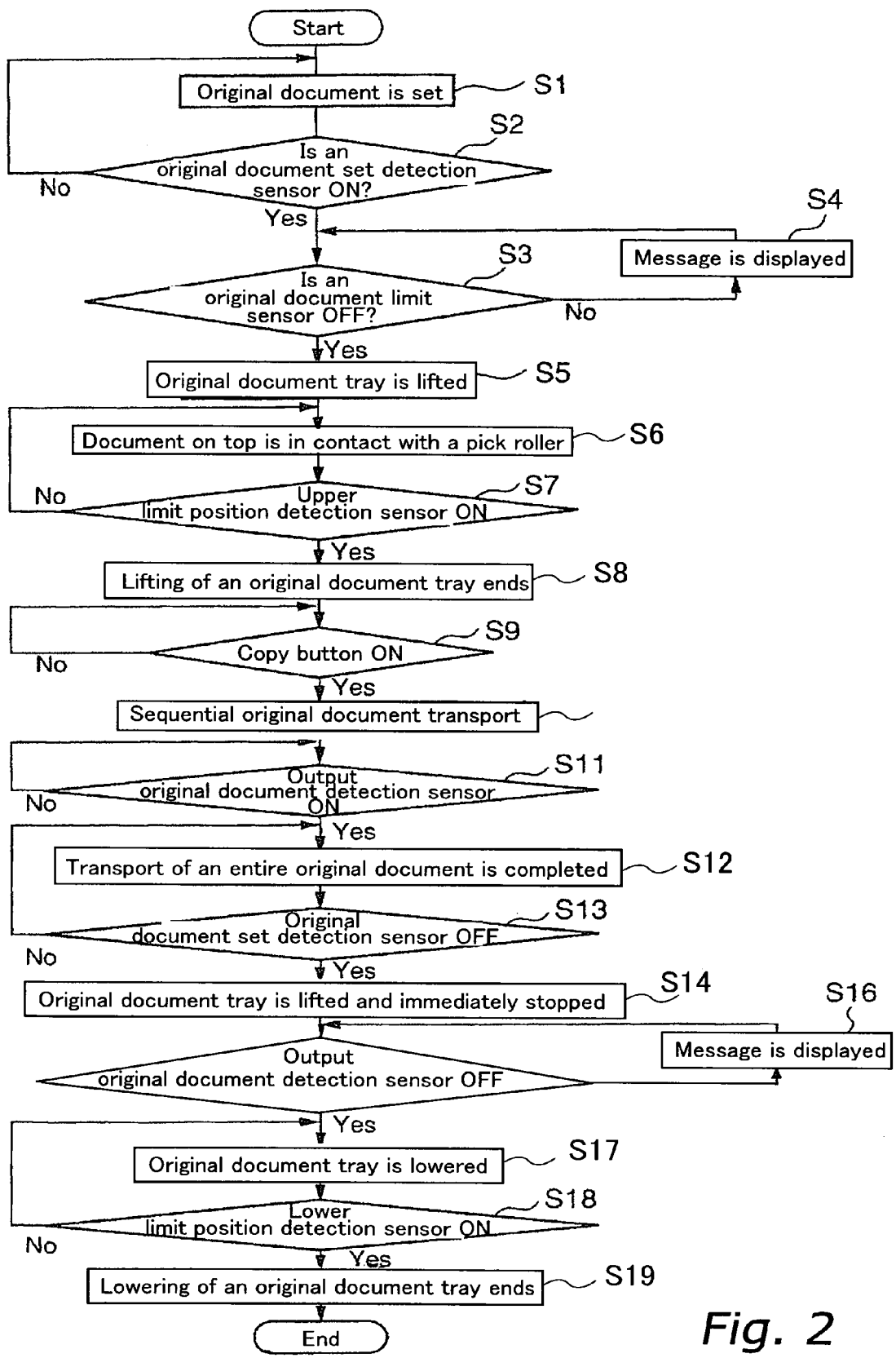
FIG. 2 is a flowchart for explaining operations of the original document transport device shown in FIG. 1.

Referring to FIG. 1 and FIG. 2, when the original document feed tray 11 is positioned at the home position, a user sets an original document on the original document feed tray 11 (step S1). Because this home position is a state where the original document feed tray 11 has been lowered down to its lowermost position, even when consideration is given to the height of the image forming device, the position of the original document feed tray 11 is low enough for people using a wheelchair or otherwise physically challenged or other short people to easily set an original document.

As shown in FIG. 1, the first tray unit 11a comprises an original document set detection sensor (original document load detection means) 31; when an original document is set on the original document feed tray 11, the original document set detection sensor 31 is turned ON. The control device (first through third control means: not shown in the drawing) monitors whether the original document set detection sensor 31 is ON, and when the original document set detection sensor 31 is turned ON (step S2), the control device checks whether an original document limit sensor (original document limit detection means) 32 is OFF.

The original document limit sensor 32 is used for detecting the amount of an original document set on the original document feed tray 11, and when the original document limit sensor 32 is ON (step S3), the control device causes an operation panel (not shown in the drawing) provided on the image forming device to display a message, for example, "Overloaded. Remove some original documents" (step S4). In accordance with this message, the user reduces the amount of the original document on the original document feed tray 11.

In step S3, when the original document limit sensor 32 is OFF, the control device controls the tray drive mechanism 24, moving it upward using the original document feed tray 11 (that is, lifting the original document feed tray 11 from the home position) (step S5).

When the uppermost original document sheet on the original document feed tray 11 is brought in direct contact with the pickup roller 14b (step S6) and the pickup roller 14b is pressed upwards, the upper limit position detection sensor (upper limit position detection means) 33 is turned ON. The control device monitors whether the upper limit position detection sensor 33 is turned ON, and when the upper limit position detection sensor 33 is turned ON (step S7), the control device stops the tray drive mechanism 24 (step S8), causing a state where the uppermost original document sheet in direct contact with the pickup roller 14b (hereinafter, a state where the uppermost original document sheet is in direct contact with the pickup roller 14b will be called an original document transportable position (second position)). This original document transportable position is a state as shown in FIG. 3, in which the control device is in a standby state.

Thereafter, the control device monitors whether the copy button (not shown in the drawing) provided on the image forming device has been pressed, and when the copy button has been pressed (step S9), the control device drives the original document transport mechanism 12 to start an original document feed operation (step S10). In other words, the original document is picked up by the pickup roller 14b and only one of the original document sheets picked up by the pickup roller is separated by the separation roller 14d to be delivered downstream by the feed mechanism 14c.

Figure 3:
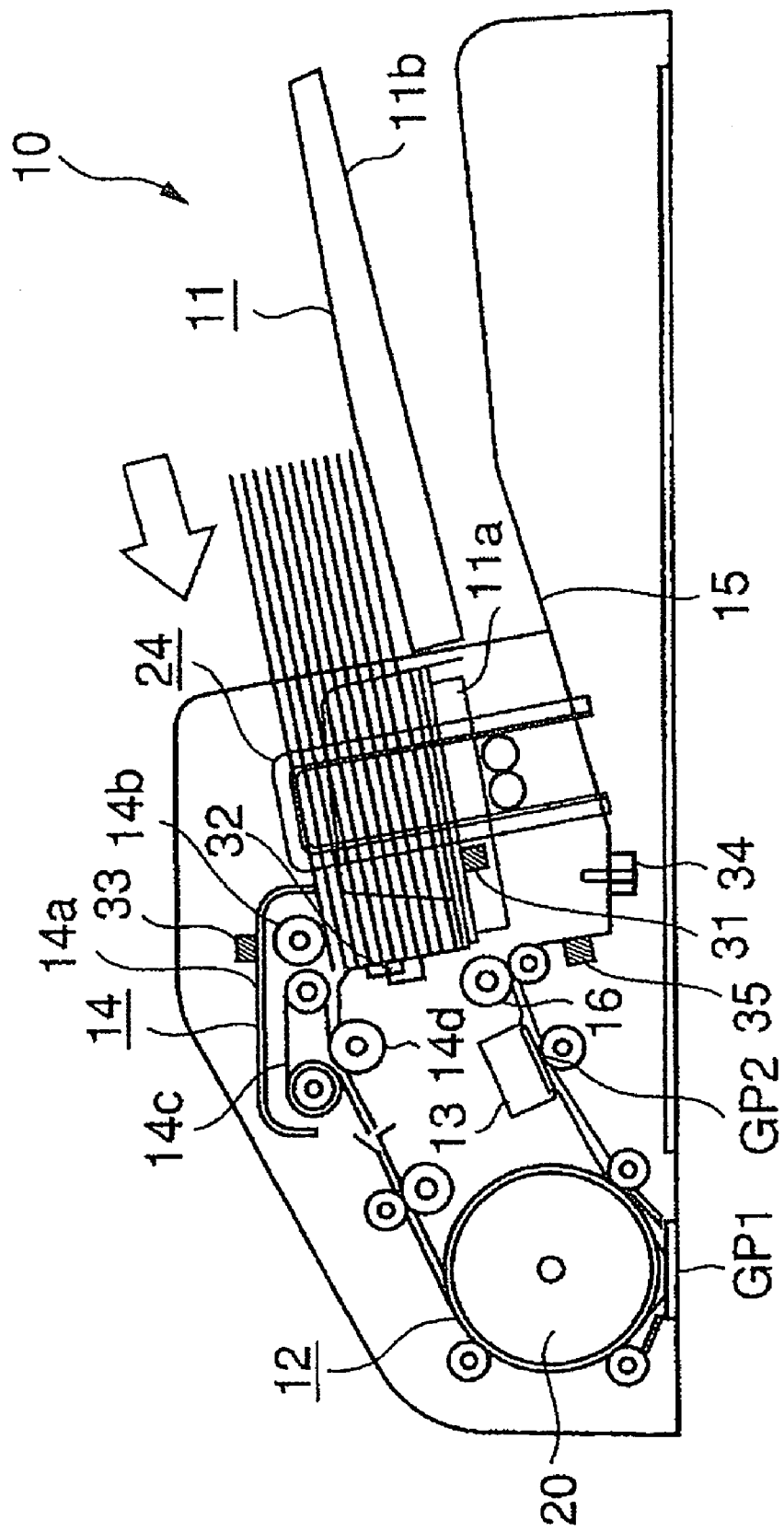
FIG. 3 illustrates a cross-sectional view showing an example of an original document transport device according to the present invention in a state where an original document feed tray is at an original document transportable position (second position)

As shown in FIGS. 1 and 3, the original document transport mechanism 12 has an original document delivery unit 20 disposed downstream of the feed mechanism 14c. The original document delivery unit 20 comprises a large diameter driving roller 25 and small diameter driven rollers 26-28, and the peripheral surfaces of the driven rollers 26-28 are in direct contact with the peripheral surface of the driving roller 25. The original document is delivered to the first original document scanning position GP1 by the original document delivery unit 20, passes the second original document scanning position GP2, and is output to the original document output tray 15.

As more of the original document sheets are transported, the number of sheets of the original document on the original document feed tray 11 becomes lower. As described above, the uppermost original document sheet on the original document feed tray 11 is detected by the upper limit position detection sensor 33, and the control device controls the tray drive mechanism 24 in accordance with detection results; thus the uppermost original document sheet is always at the same position with respect to the pickup roller 14b (i.e. the uppermost original document sheet is positioned at the original document transportable position).

Figure 4:
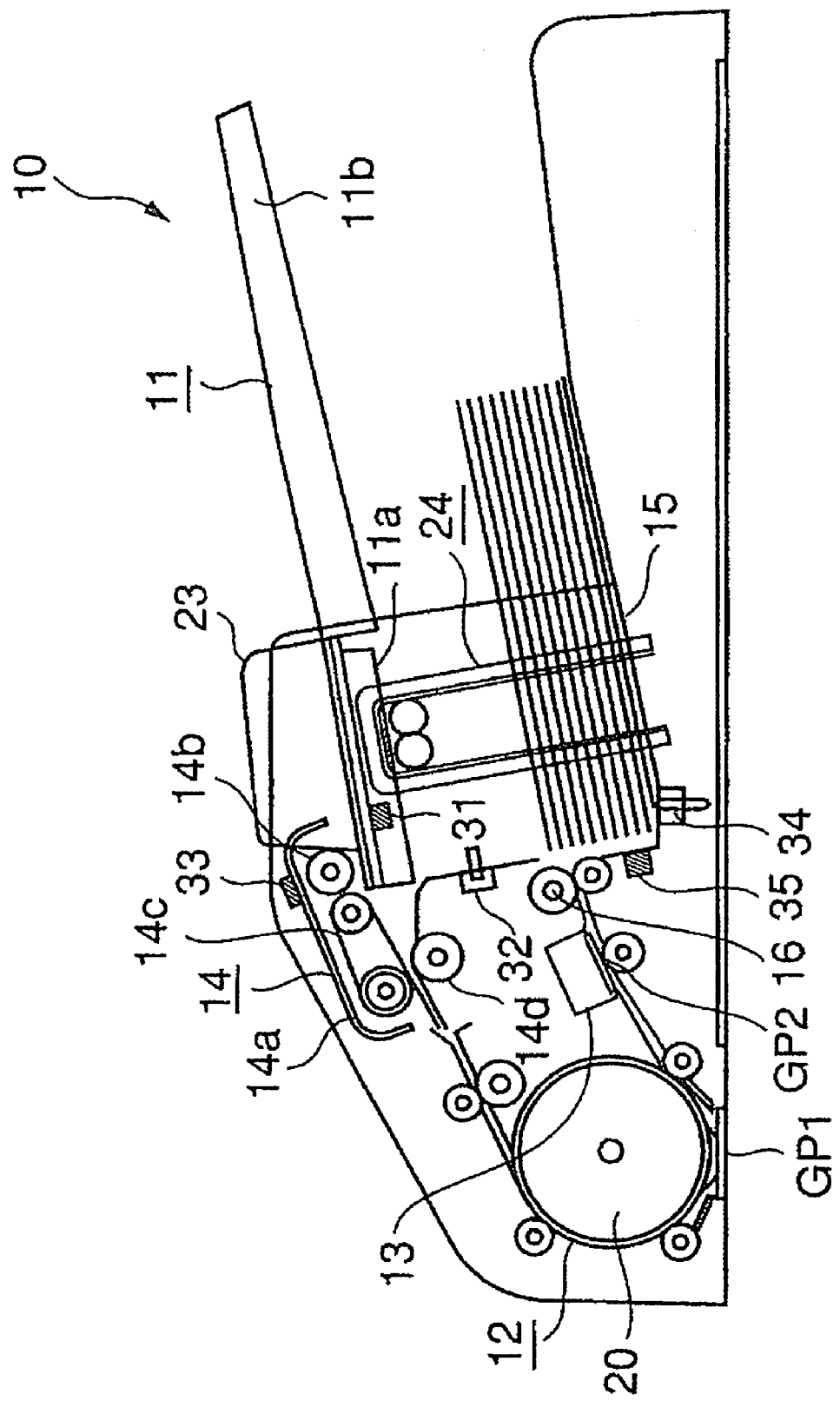
FIG. 4 illustrates a cross-sectional view showing an example of an original document transport device according to the present invention in a state where an original document feed tray is at an original document tray upper withdrawal position (third position).

Referring to FIGS. 3 and 4, an output original document detection sensor (original document output detection means) 34 is disposed on the original document output tray 15, and when the original document is output to the original document output tray 15, the output original document detection sensor 34 is turned ON. The control device monitors ON/OFF of the output original document detection sensor 34, and when the output original document detection sensor 34 has been turned ON (step S11), the control device stands by until transport of the entire original document has been completed (entire original document transport completion: step S12). When the entire original document has been fed, the original document set detection sensor 31 is turned OFF, and when the original document set detection sensor 31 has been turned OFF (step S13), the control device controls the tray drive mechanism 24 to lift the original document feed tray 11 only to a degree set in advance, and then immediately stops the tray drive mechanism 24 (step S14).

This state is shown in FIG. 4; in this state, the original document feed tray 11 is positioned higher than the position of the original document feed tray 11 after the entire original document on the original document feed tray 11 has been fed (hereinafter, this position will be called an original document tray upper withdrawal position (third position). In the state shown in FIG. 4, because the pickup roller 14b is upwardly pushed by the original document feed tray 11, the roller housing 14a pivots upward, supported at the core of the shaft center of the feed roller 141 positioned downstream in the original document transport direction.

When the original document feed tray 11 is at the original document tray upper withdrawal position, the distance between the upper surface of the original document output tray 15 and the lower surface of the original document feed tray 11 is sufficiently large, and even after the original document has been output to the original output tray 15, the distance between the original document positioned uppermost and the lower surface of the original document feed tray 11 remains large, allowing a user to easily remove the original document using both hands from the original document output tray 15.

Subsequently, the control device monitors whether the output original document detection sensor 34 has been turned OFF (step S15), and if, after step S14, the output original document detection sensor 34 has been ON for a predetermined length of time, the control device displays on the operation panel a message, for example, "Remove the original document," to remind the user to remove the original document (step S16).

On the other hand, when the output original document detection sensor 34 is turned OFF, the control device determines that the original document was removed, and controls the tray drive mechanism 24 to lower the original document feed tray 11 from the original document tray upper withdrawal position (step S17). A lower limit position detection sensor (lower limit position detection means) 35 for detecting that the original document feed tray (first tray unit 11a) is positioned at the home position is attached to the device housing, and when the control device starts lowering the original document feed tray 11 and the lower limit position detection sensor 35 is turned ON (step S18), the tray drive mechanism 24 is stopped. In other words, the lowering of the original document feed tray 11 is stopped (step S19) so as to position the original document feed tray 11 at the home position.

Thus, when the original document is set, the original document feed tray is positioned at the home position, which is the lowermost position, and when feeding of the original document ends, the original document feed tray is further lifted only to a predetermined extent, thereby allowing easy setting of an original document as well as easy removal of a scanned original document.

What is claimed is:

1. An original document transport device comprising:
   an original document loading member;
   an original document output member arranged at a first position below the original document loading member;
   an original document transport mechanism configured to transport individual documents from the original document loading member to an original scanning position;
   an original document feed roller mechanism disposed above the original document output member and the original document transport mechanism, the original document feed roller mechanism being arranged to transport the individual documents from above downward to the original document output member by way of the original document transport mechanism;
   an original document load detection member configured to detect when the original documents have been loaded onto the original document loading member;
   a drive mechanism connected to the original document loading member to move the original document loading member in a substantially vertical direction so as to create a variable distance between the original document loading member and the original document output member; and
   a control device configured to control the drive mechanism so as to position the original document loading member between the first position, a second position and a third position,
   the first position is for loading original documents onto the original document loading member, the third position is for removing discharged original documents from the original document output member, the third position being located at a maximum distance above the first position, and the second position is for transporting the original documents to the original document transport mechanism, the second position being between the first position and the third position.

2. The original document transport device according to claim 1, wherein at the first position the original document loading member is in direct contact with the original document output member.

3. The original document transport device according to claim 1, further comprising;
   a lower limit position detection member for detecting when the original document loading member is positioned at the first position; and
   an upper limit position detection member for detecting when the uppermost original document on the original document loading member is positioned at the second position.

4. The original document transport device according to claim 1, further comprising
   an original document limit detection member for detecting the maximum amount of original documents loaded onto the original document loading member,
   wherein when the amount of original documents detected by original document limit detection member is less than the maximum amount, the drive mechanism by way of the control device is configured to move the original document loading member from the first position to the second position.

5. The original document transport device according to claim 1, further comprising an original document output detection member for detecting whether the original document has been discharged to the original document output member, wherein when the original document has been detected by the original document output detection member and the original document has not been detected by the original document load detection member, the drive mechanism by way of the control device is configured to move the original document loading member from the second position to the third position.

6. The original document supply device according to claim 5, wherein after the original document loading member has been moved from the second position to the third position, if no original documents are detected on the original document output member by the original document output detection member, the drive mechanism by way of the control device is configured to lower the original document loading member to the first position.

* * * * *